United States Patent [19]

Jordan, Jr.

[11] Patent Number: 5,062,038

[45] Date of Patent: Oct. 29, 1991

[54] INFORMATION CONTROL SYSTEM

[75] Inventor: John D. Jordan, Jr., Worthington, Ohio

[73] Assignee: AT&T Bell Laboratories, Murray Hill, N.J.

[21] Appl. No.: 452,100

[22] Filed: Dec. 18, 1989

[51] Int. Cl.$^5$ .............................................. G06F 15/40
[52] U.S. Cl. ................................ 364/200; 364/246.6; 364/246.8; 364/282.1; 364/282.2
[58] Field of Search ................................ 364/200, 900

[56] References Cited

U.S. PATENT DOCUMENTS

| | | | |
|---|---|---|---|
| 4,604,694 | 8/1986 | Hough | 364/200 |
| 4,627,019 | 12/1986 | Ng | 364/900 |
| 4,677,550 | 6/1987 | Ferguson | 364/200 |
| 4,698,752 | 10/1987 | Goldstein et al. | 364/200 |
| 4,716,528 | 12/1987 | Crus et al. | 364/300 |
| 4,823,261 | 4/1989 | Bank et al. | 364/200 |
| 4,823,310 | 4/1989 | Grand | 364/900 |
| 4,827,411 | 5/1989 | Arrowood et al. | 364/200 |
| 4,827,508 | 5/1989 | Shear | 380/4 |
| 4,914,569 | 4/1990 | Levine et al. | 364/200 |
| 4,937,736 | 6/1990 | Chang et al. | 364/200 |
| 4,965,719 | 10/1990 | Shoens et al. | 364/200 |

OTHER PUBLICATIONS

"Concurrent Operation on B-Trees with Overtaking", by Sagiv ACM Sigact-Sigmond Symposium on Principles of Database System, Mar. 1985, pp. 28-37.
"Locking Protocol for Concurrent Operations on B-Trees", IBM Technical Disclosure Bulletin, vol. 19, No. 10, Mar., 1977, pp. 3887-3889.
"Multi-Access Data Sharing Facility Utilizing Magnetic Bubble Storage", IBM Technical Disclosure Bulletin, vol. 23, No. 8, Jan., 1981, pp. 3882-3885.
"Ubiquitous B-Tree", Computer Surveys, vol. 11, No. 2, Jun., 1979, pp. 121-137.
"Locking Architecture in a Multiple Virtual Memory Multi-Processing System", IBM Technical Disclosure Bulletin, vol. 16, No. 7, Dec. 1973.
"Sharing of Disk Files Without Locking", IBM Technical Disclosure Bulletin, vol. 22, No. 7, Dec., 1979, pp. 2887-2889.
"Integrated Concurrency and Shared Buffer Coherency Control for Multi-Systems", IBM Technical Disclosure Bulletin, vol. 28, No. 10, Mar., 1986, pp. 4642-4650.
"Index Mini-Pages", IBM Technical Disclosure Bulletin, vol. 25, No. 11A, Apr., 1983, pp. 5460-5463.
"Multilevel Locking with Deadlock Avoidance", IBM Technical Disclosure Bulletin, vol. 21, No. 4, Sep., 1978, pp. 1723-1728.
"Efficient Locking for Concurrent Operation on B-Trees", ACM Transaction on Database System, vol. 6, No. 4, Dec., 1981, pp. 650-670.
"Transaction Monitoring in Encompass (TM): Reliable Distributed Transaction Processing", by Borr, Procedures International Conference on Very Large Data Bases, Sep., 1981, pp. 244-254.
"Index Locking and Splitting", IBM Technical Disclosure Bulletin, vol. 25, No. 7B, Dec., 1985, pp. 3725-3927.
"Operating Systems—An Advanced Course," Messrs. M. J. Flynn, J. N. Gray, A. K. Jones, K. Lagally, H. Opderbeck, G. J. Popek, B. Randel, J. H. Saltzer and H. R. Wiehle, *Springer-Verlag*, New York-Berlin-Heidelberg-Tokyo, Third printing, 1984, pp. 430 through 450.
"Object-Oriented Concepts and Data Bases and Applications," Messrs. Won Kim and F. H. Lochovsky, *Addison-Wesley*, 1989, pp. 270 through 273.

*Primary Examiner*—Allen R. MacDonald
*Assistant Examiner*—Ayaz R. Sheikh
*Attorney, Agent, or Firm*—Dwight A. Marshall

[57] ABSTRACT

Apparatus and method for controlling concurrent process access of infrastructures. Apparatus and method responds to a process request by selectively locking ones of the nodes and enables other processes to concurrently lock ancestral and child nodes located in the tree structure of the locked node independent of the lock applied to the selectively locked node thereby enabling concurrently running processes to write into and read information from the locked nodes.

16 Claims, 4 Drawing Sheets

TABLE 1

| TYPE LOCK | ANCESTOR LOCK |
|---|---|
| NODE EXCLUSIVE (NE) | INTERMEDIATE EXCLUSIVE (IE) |
| NODE RESERVE (NR) | INTERMEDIATE RESERVE (IR) |
| INTERMEDIATE RESERVE (IR) | INTERMEDIATE RESERVE (IR) |
| INTERMEDIATE EXCLUSIVE (IE) | INTERMEDIATE EXCLUSIVE (IE) |
| NODE SHARE (NS) | INTERMEDIATE SHARE (IS) |
| INTERMEDIATE SHARE (IS) | INTERMEDIATE SHARE (IS) |

FIG. 3

TABLE 2

|    | NE | NR | IR | IE | NS | IS |
|----|----|----|----|----|----|----|
| NE | ✓  | ✓  |    |    | ✓  |    |
| NR | ✓  | ✓  |    |    |    |    |
| IR |    |    |    |    |    |    |
| IE |    |    |    |    |    |    |
| NS | ✓  |    |    |    |    |    |
| IS |    |    |    |    |    |    |

FIG. 4

INFORMATION CONTROL SYSTEM

CROSS-REFERENCE TO RELATED APPLICATIONS

This application is related to the following applications, which are assigned to the same assignee and concurrently filed herewith:

J. D. Jordan, Jr., Case 2, "Information Control System";

J. D. Jordan, Jr., Case 3, "Information Control System";

J. D. Jordan, Jr., Case 4, "Information Control System"; and

J. D. Jordan, Jr., Case 5, "Information Control System."

TECHNICAL FIELD

The invention relates to apparatus and method for controlling concurrent process operations against composite information infrastructures.

BACKGROUND AND PROBLEM

Composite infrastructures intended for use with computer systems oftentimes have an information architecture environment having interconnected complex object nodes. Each object node may have independent tree-like structures comprising hierarchies of interconnected complex subordinate object nodes of information wherein each subordinate object node may further comprise independent sub-tree structures of interconnected sub-nodes of information.

Computer systems using infrastructures may run processes wherein the processes are required to concurrently access an infrastructure. In particular, a computer system may run a number of processes each of which requires access to a complex infrastructure comprising data base architectures. A process may require access to one, several or all of the infrastructure nodes many times during the running of the process. In order to insure continuity of operation, a process may apply an exclusive lock against a node that will operate against the node and impliedly against all the lower hierarchical subordinate and sub-nodes in the tree structure of the node to allow only the process holding the exclusive lock to write into and read information from the node. In addition, all ancestor nodes of the node assigned an exclusive lock are assigned an intermediate exclusive lock to ensure a consistency of data. During the time that a process holds the exclusive lock, other processes concurrently running on computers served by the complex infrastructure are prevented from writing into and reading information from the node, the ancestor nodes and child nodes located in the tree structure of the node to which the exclusive lock was applied. A process may also apply a share lock against a node and an intermediate share lock against ancestor nodes of the share locked node that allows the process and other processes to only read information from the nodes and which share lock operates to prevent a process from applying an exclusive lock thereto.

A problem arises during concurrent operation of multiple processes in that when one process exclusively locks a node other processes that require access to ancestor and children nodes of the exclusively locked node must wait until the exclusive lock is removed from the node. Similarly, an intermediate share lock applied to ancestral nodes of a share locked node prevents other processes from applying an exclusive lock to the ancestral nodes until such time as the intermediate share lock is removed. Another problem arises in that a running process required to apply either an exclusive or share lock to an ancestral or child node of a previously locked node may be halted when concurrently running processes apply locks before the running process can execute the appropriate command.

SOLUTION

The foregoing problems are solved by apparatus and method arranged to control concurrent process operations against a complex infrastructure comprising tree structures of complex object nodes wherein the apparatus responds to a process lock request by selectively locking ones of the nodes and subsequently enabling other processes to concurrently lock ancestral and child nodes located in the tree structure of a previously locked node independent of the lock applied to the previously locked node.

The apparatus and method responds to a process request for a node lock by selecting the node and generating a list of ancestral nodes related thereto. A compatibility of an intermediate lock corresponding with the requested lock is compared with a current lock status of each listed ancestral node. Upon determining the compatibility of the intermediate lock with the current lock status of each ancestral node, the intermediate lock is applied to the ancestral node and the ancestral node current lock status updated to record the application of the intermediate lock. Apparatus is enabled upon applying the intermediate lock to all ancestral nodes for comparing a compatibility of the process requested lock with a current lock status of the selected node and upon determining the compatibility of the requested lock with the selected node current lock status for applying the process requested lock thereto and updating the selected node current lock status to record application of the process requested lock. The apparatus and method compares other process requested locks with a current lock status of each ancestral node of the selected node and is operative upon determining a compatibility of each other process requested lock with the ancestral node current lock status for applying the other process requested lock to ancestral and child nodes of the selected node thereby enabling the other processes to concurrently write into and read information from the locked ancestral and child nodes independent of the current lock status of the selected node.

BRIEF DESCRIPTION OF THE DRAWING

FIG. 3 sets forth an illustrative table showing a relationship of complex node locks with corresponding intermediate locks applicable to ancestral nodes related to a selected complex node;

FIG. 4 illustrates an illustrative table setting forth a compatibility of selected locks with current lock status of selected nodes and node ancestors of the selected node.

DETAILED DESCRIPTION

Figure 1:
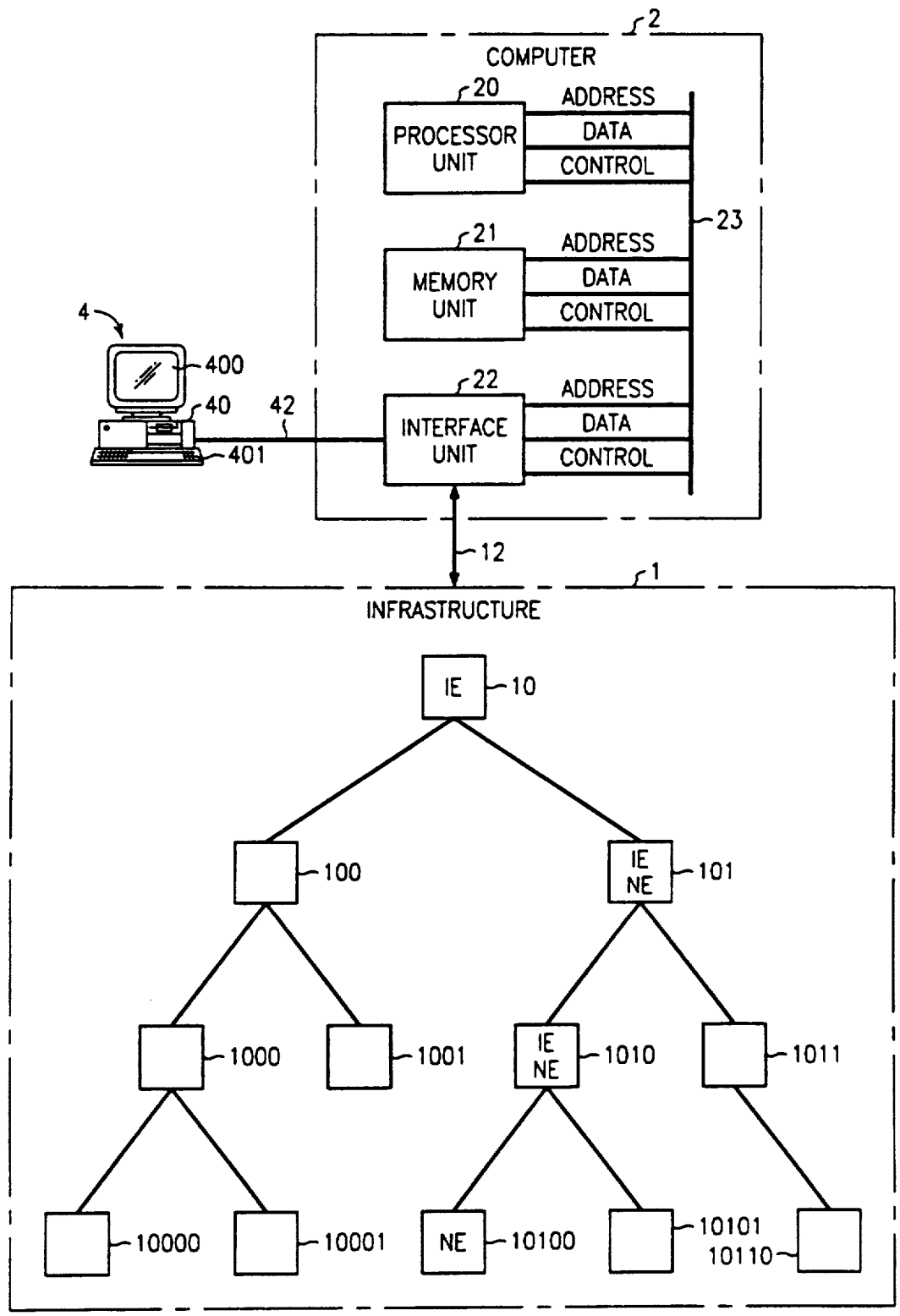
FIG. 1 illustrates an information control system embodying the principles of the invention.

In an exemplary embodiment of the invention, FIG. 1, a control information system has a storage system, such as a data base system, that may be located in storage apparatus intended for use with a single or multiple computer systems such as computer system 2. A data base system, hereinafter referred to as infrastructure 1, may have a single or number of infrastructures 1 stored therein that may be used by processes running within computer system 2. Each infrastructure 1 may comprise information, such as data required for the operation of processes, or may be software programs and macros that may be accessed at various times during the operation of a process and used by the process in the execution of various process features.

A typical information infrastructure, such as infrastructure 1, may have a root node 10 and a number of interconnected complex nodes 100, 101 each of which may, in an embodiment of the invention, be a file of information. Each complex node 100, 101, hereinafter referred to as a file node 100, 101, may have independent tree-like structures comprising hierarchies of interconnected complex subordinate nodes 1000, 1001, 1010, 1011 which may be blocks of information and which are hereinafter referred to as block nodes 1000, 1001, 1010, 1011. A complex subordinate node, or block node 1000, 1001, 1010, may further have independent sub-tree structures of interconnected sub-nodes 10000, 10001, 10100, 10101, 10110 of information and which are hereinafter referred to as information nodes. In the embodiment of the invention, infrastructure 1 has two file nodes 100, 101 interconnected with root node 10. File node 100, for example, may have two independent tree structures, one tree structure which includes block node 1001 and the other tree structure a two level hierarchy tree structure comprising block node 1000. Block node 1000 has two independent sub-tree structures one of which includes information node 10000 and the other sub-tree which includes information node 10001. File node 101 is also assumed to have two independent tree structures, one tree structure which comprises a two level hierarchy of block node 1011 and information node 10110 and the other tree structure which comprises a two level hierarchy of block node 1010 which in turn has a sub-tree structure comprising information nodes 10100, 10101. It is to be understood that other configurations of infrastructure 1 are within the teaching of the invention and the invention is not limited by the specific structure of infrastructure 1.

Infrastructure 1 may be accessed by one or a number of computers such as computer 2. Computer 2 may be any of a number of different types of computers, such as an AT&T 3B2-400 and 3B2-310 simplex or duplex computers. Such computers need not be described in detail for an understanding of the invention and in general have a processor unit 20, memory unit 21 and an interface unit 22 each connected by address, data and control leads to a bus 23. Interface unit 22 couples data links 12 and 42 extending, respectively, to data storage devices, such as infrastructure 1 and computer terminal 4, with bus 23 so that data may be exchanged with processor unit 20 by computer terminal 4 and infrastructure 1. Computer terminal 4, which may be any of a number of well-known computer terminals or personal computers, is coupled to interface unit 22 so that data may be entered into and read from processor unit 20 and memory unit 21 by computer terminal 4. Computer terminal 4 may also have, but not necessarily limited thereto, a processor unit 40, an input device, such as keyboard 401, and a display device similar to CRT terminal 400.

It is to be understood that infrastructure 1 may be located remote from computer 2 and coupled therewith by data links 12. In addition, infrastructure 1, within an embodiment of the invention, may be coupled to a large number of computers 2 either by data links, such as data link 12, or by a communication network sometimes referred to as a ring or star-type of network. Although FIG. 1 of the drawing shows infrastructure 1 coupled by data link 12 with interface unit 22, it is to be understood that infrastructure 1 could be resident as a data base in a memory storage device that could be a part of a mainframe computer, such as computer 2, and coupled with data bus 23 such that processes controlling the operation of computer 2 could access infrastructure 1.

Figure 2:
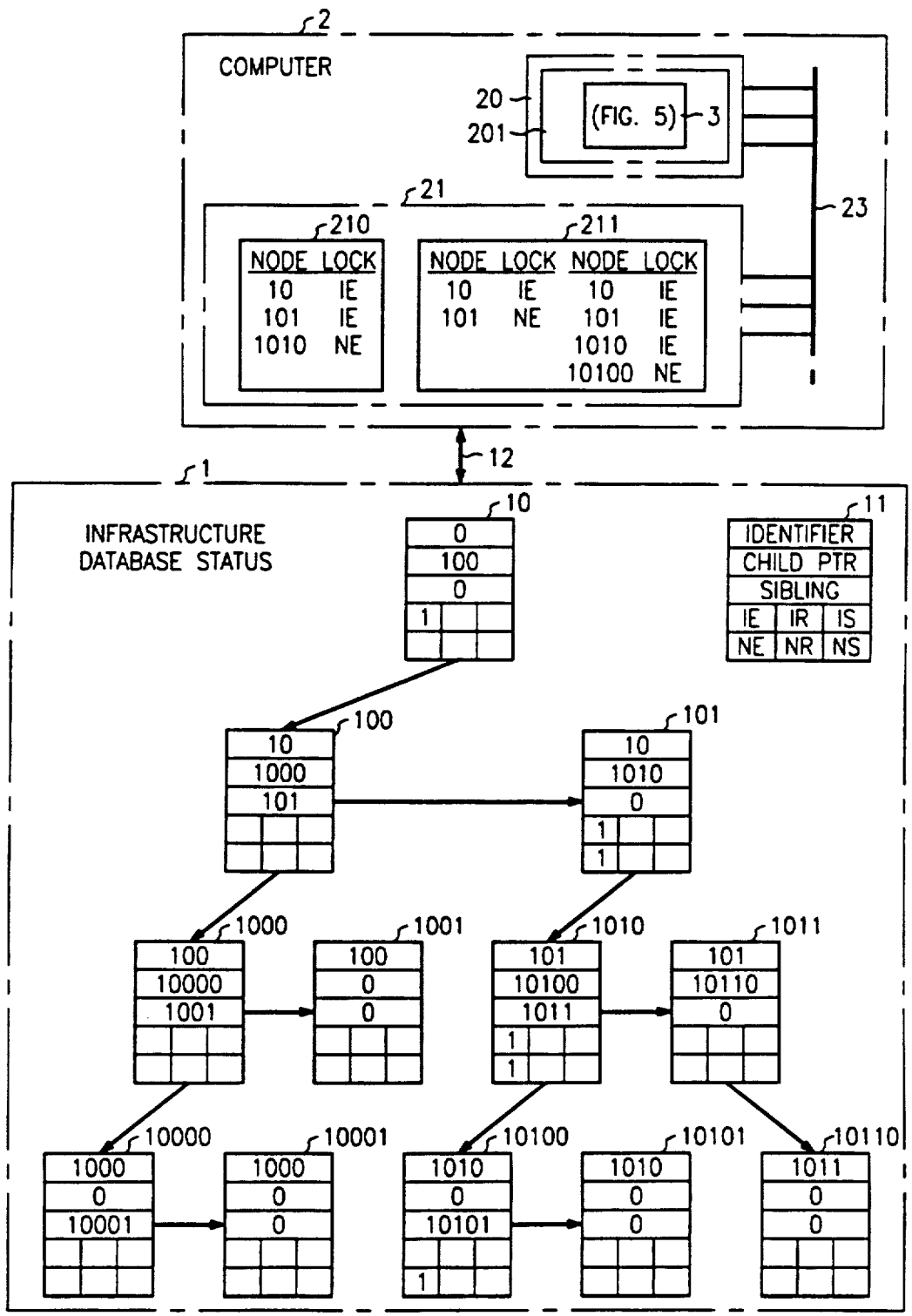
FIG. 2 sets forth illustrative processes and operation of the information control system of FIG. 1.

Referring to FIG. 2, each complex node of infrastructure 1 is configured in accordance with key 11 wherein each node has an identifier pointing to the ancestor of the node. In addition, each node identifies a dependent child of the node and a sibling node having the same ancestor as the node. For example, block node 1010 has an identifier of 101 pointing to file node 101 as a direct ancestor of block node 1010. The child pointer information identifies information node 10100 as a child of block node 1010 and the sibling information identifies block node 1011 having the same ancestor node 101 as does block node 1010.

Each complex node of infrastructure 1 also includes information indicating the current lock status of the node. Such information is assumed for the present embodiment of the invention to be a register, although not limited thereto. A register, shown in key 11, records the current lock status of a node of infrastructure 1. For example, a register corresponding with a node may indicate that node exclusive NE, share NS and reserve NR locks and intermediate exclusive IE, share IS and reserve IR locks have been applied to a node. As an example, a register corresponding with file node 101, FIG. 2, indicates that intermediate and node exclusive IE, NE locks have been applied to file node 101.

In the operation of the present embodiment of the invention, processes 210, 211 resident in memory unit 21 of a computer, such as computer 2, are run in processor unit 20 with program 3 to control access to infrastructure 1. If process 210 requires the reading of information from block node 1010, computer 2 obtains access of infrastructure 1, FIG. 1, via bus 23, interface unit 22 and data link 12. Root node 10 register, FIG. 2, may initiate the direct selection of block node 1010 or by information which identifies child file node 100. File node 100 directs process 210 to sibling file node 101 which in turn points to child block node 1010. In order to write into or read information from block node 1010, process 210, via operation of program 3, must determine the current lock status of block node 1010.

Computer 2, having access to infrastructure 1, may run multiple process operations that require concurrent access to complex nodes of infrastructure 1. Computer 2, operating in accordance with program 3 and in response to a process request, may selectively lock ones of the nodes and also enable other processes to concurrently lock ancestral and child nodes located in the tree structures of the locked nodes independent of the lock applied to the locked node. The apparatus of the invention responds to a process request for a lock by selecting the appropriate node identified by the process and generating a list of ancestral nodes related to the selected node. If, for example, process 210, FIG. 2, requests that a node exclusive NE lock be applied against block node 1010, program 3, selects block node 1010 and generates a list of ancestral nodes, FIG. 1, related to selected block node 1010 comprising root node 10, file node 101 and which list also includes selected block node 1010.

The apparatus operating under control of program 3, FIG. 2, selects root node 10 from the generated list of ancestral nodes and determines in accordance with table 1, FIG. 3, that an intermediate exclusive IE lock is required to be applied against an ancestral node, such as root node 10, when the requested node exclusive NE lock is to be applied against a child node of root node 10 such as block node 1010. The compatibility of the ancestral node intermediate type of lock as determined by table 1, is compared for compatibility, FIG. 4, table 2, with the current lock status identifying locks that are currently applied against the ancestral node. The present embodiment of the invention indicates that each lock applied against a node, FIG. 2, is recorded as a current lock status in register key 11 corresponding with each node. As set forth in compatibility table 2, FIG. 4, intermediate exclusive IE lock is compatible with node and intermediate exclusive, reserve and share NE, NR, NS, IE, IR, IS locks. Thus, the instant intermediate exclusive IE lock may be applied to root node 10 even though the current register status of root node 10 may indicate that node and intermediate exclusive, reserve and share NE, NR, NS, IE, IR, IS locks are currently pending against root node 10. In addition to intermediate exclusive IE locks, compatibility table 2 also indicates that an intermediate reserve and share IR, IS locks are compatible with node and intermediate exclusive, reserve and share NE, NR, NS, IE, IR, NS locks. Thus, when the register corresponding with root node 10 indicates that node and intermediate exclusive, reserve and share NE, NR, NS, IE, IR, IS locks are currently pending against root node 10, then intermediate exclusive, reserve and share IE, IR, IS locks may be applied to root node 10.

When it is determined that intermediate exclusive IE lock is compatible with the current lock status of root node 10, the intermediate exclusive IE lock is applied to ancestral root node 10 and the current lock status of root node 10 is updated by setting the register corresponding with root node 10 to indicate that an intermediate exclusive IE lock is currently pending against root node 10. Following the setting of registers to record that an intermediate exclusive IE lock is currently applied against all ancestral nodes of block node 1010, such as ancestral root node 10 and file node 101, FIG. 2, program 3 determines the compatibility of the requested node exclusive NE lock with the current lock status of block node 1010. In accordance with compatibility table 2, FIG. 4, a node exclusive NE lock is compatible with intermediate exclusive, reserve and share IE, IR, IS locks and is incompatible with node exclusive, reserve and share NE, NR, NS locks. Unless node exclusive, reserve, share NE, NR, NS locks are currently pending against block node 1010, the register associated with block node 1010, FIG. 2, is updated to record that a node exclusive NE lock has been applied against block node 1010.

When the apparatus of computer 2, operating in accordance with program 3, FIG. 4, detects that a node exclusive NE lock has been applied against the block node 1010, other processes are prevented from obtaining node exclusive, reserve and share NE, NR, NS locks on block node 1010 in that a node exclusive NE lock is not compatible with node exclusive, reserve, share NE, NR, NS locks. Since process 210, FIG. 2, has applied a node exclusive NE lock to block node 1010, other processes, such as process 211, are prevented from applying node exclusive, reserve, share NE, NR, NS locks on block node 1010 in that these locks are incompatible with the node exclusive NE lock currently pending against block node 1010.

However, a currently running process, such as process 211, may apply intermediate exclusive, reserve and share IE, IR, IS locks against block node 1010. Thus, if process 211 requests a node exclusive NE lock on file node 101, program 3 generates an ancestral list including root node 10 and file node 101. The intermediate exclusive IE lock corresponding to the requested node exclusive NE lock, table 1, FIG. 3, is compared with the current status of ancestral root node 10 indicating that an intermediate exclusive IE lock is currently pending against root node 10. Since an intermediate exclusive IE lock is compatible with the intermediate exclusive IE lock currently pending against root node 10, table 2, FIG. 4, the intermediate exclusive IE lock is applied to root node 10, FIG. 2, and the register corresponding thereto is updated to show that root node 10 still has a pending intermediate exclusive IE lock applied thereto. Table 2, FIG. 4, shows that the node exclusive NE lock requested for file node 101 is compatible with the intermediate exclusive IE lock currently pending against file node 101. In accordance with the principles of the invention, FIG. 2, the requested node exclusive NE lock is applied to file node 101 and the register corresponding therewith is updated to show that node and intermediate exclusive NE, IE locks are currently pending against file node 101.

If process 211 were to subsequently request a node exclusive NE lock on information node 10100, program 3 generates an ancestral list including root node 10, file node 101, block node 1010 and information node 10100. The intermediate exclusive IE lock corresponding to the requested node exclusive NE, table 1, FIG. 3, is compared with the current status of ancestral root node 10, file node 101 and block node 1010. Since an intermediate exclusive IE lock is compatible, table 2, FIG. 4, with the intermediate and node exclusive IE, NE locks currently pending against ancestral root node 10, file node 101 and block node 1010, respectively, the registers corresponding with these nodes are updated to indicate that the intermediate exclusive IE lock is being applied thereto. Since no locks, FIG. 2, are currently pending against information node 10100, the register corresponding with information node 10100 is updated to indicate that a node exclusive NE lock is currently pending against information node 10100.

As set forth in FIG. 2, infrastructure 1 currently has intermediate exclusive IE locks pending against root node 10, file node 101 and block node 1010 and node exclusive NE locks pending against file node 101, block node 1010 and information node 10100. In accordance with the principles of the invention, computer 2 compares the locks requested by the other process 211 concurrently running with process 210 with a current lock status of each ancestral root and file node 10, 101 and child node 10100 of block node 1010 originally selected by process 210. The apparatus is operative, upon determining a compatibility of each lock requested by process 211 with the ancestral and child node current lock status, for applying the lock requested by other process 211 to ancestral nodes 10, 101 and child node 10100 of block node 1010 thereby enabling process 211 to concurrently write into and read information from the node exclusive NE locked ancestral node 101 and child node 10100 independent of the current lock status of block node 1010.

It is assumed that infrastructure 1, FIG. 2, is initially free of all locks and that all registers corresponding with complex nodes are clear. It is further assumed that process 210, currently running on computer 2, has a requirement to apply a node exclusive NE lock on block node 1010. Program 3, running under control of process 210, FIG. 5, selects a block node 1010, step 301, and the type of lock, such as the requested node exclusive NE lock, to be applied to selected block node 1010, step 302. Program 3 then asks if there are ancestor nodes, step 303, and when it is determined that there are ancestor nodes, step 304, generates a list of the appropriate ancestor nodes. The ancestor list for block node 1010, FIG. 1, would include root node 10, file node 101 and block node 1010.

Figure 5:
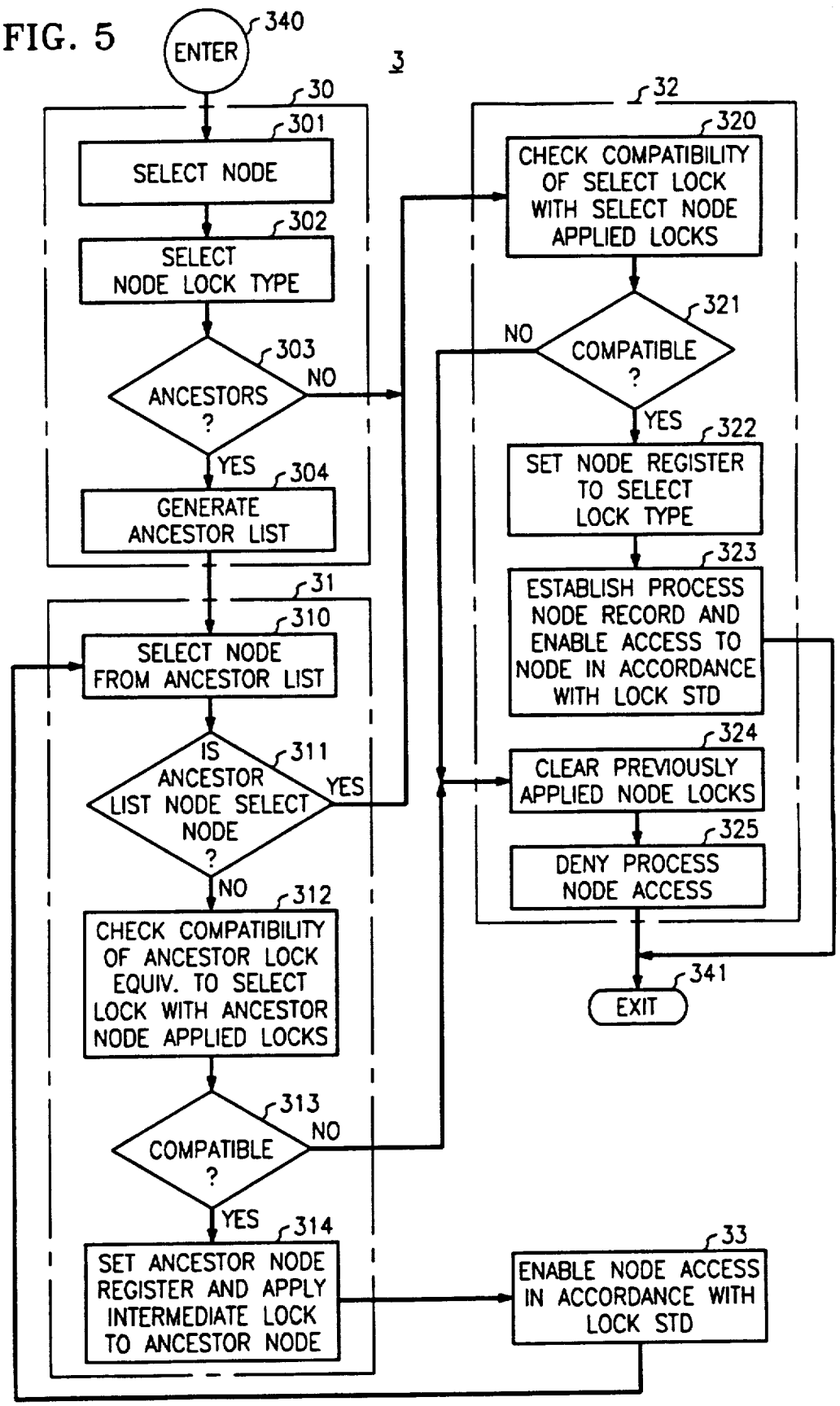
FIG. 5 illustrates a flow chart of the operation of the information control system set forth in FIG. 1 in accordance with the principles of the invention.

Program 3, step 310, FIG. 5, selects the first ancestor node, root node 10, and since it is not the select node, step 311, determines from table 1, FIG. 3, that an intermediate exclusive IE lock is required for each ancestor node when a node exclusive NE lock is to be applied to a child node such as block node 1010. The compatibility of the intermediate exclusive IE lock, step 312, is determined by comparing intermediate exclusive IE lock with any locks that have previously been applied to root node 10. When it is determined, step 313, that intermediate exclusive IE lock, table 2, FIG. 4, is compatible with any locks previously applied to root node 10, program 3 applies the intermediate exclusive IE lock to root node 10 and sets the register associated therewith to record that an intermediate exclusive IE lock is pending against ancestral root node 10, steps 313, 314. Since infrastructure 1 is assumed to be initially free of locks, root node 10 register does not record any pending locks and it is determined that an intermediate exclusive IE lock can be applied to root node 10. Computer 2 then enables process access to root node 10 in accordance with the current lock status of the register associated with root node 10, step 33.

Program 3, step 31, continues to compare the compatibility of the intermediate exclusive IE lock corresponding with the selected node exclusive NE lock for listed ancestral file node 101, FIG. 1, with a current lock status as recorded in the register corresponding with file node 101 by repeating steps 310 through 314. Since infrastructure 1 was initially free of locks, intermediate exclusive IE lock is compatible with file node 101 and the register thereof, FIG. 2, is set to indicate that an intermediate exclusive IE lock has been applied thereto. Access to file node 101, FIG. 5, step 33, is granted to concurrently running processes, such as processes 210, 211, in accordance with compatibility tables 1 and 2, FIGS. 3 and 4, respectively.

After setting the register of ancestor file node 101 to indicate that an intermediate exclusive IE lock has been applied and after enabling process access thereto, steps 314, 33, FIG. 5, program 3 selects the next node from the ancestor list, step 310, which is selected block node 1010. The selected node exclusive NE lock to be applied to block node 1010, is compared as is set forth by table 2, FIG. 4, with any previously set locks recorded by the register associated with block node 1010, FIG. 2. Since block node 1010 is the select node, step 311, FIG. 5, and is initially free of any pending locks, it is determined that the selected node exclusive NE lock is compatible with block node 1010, steps 320, 321. Since block node 1010 is the selected node, step 322, the register of block node 1010, FIG. 2, is set to record that a node exclusive NE lock has been applied thereto. Program 3, FIG. 5, step 323, enables process access to block node 1010 and establishes a node record of the locks currently applied to infrastructure 1, FIG. 2, in process 210 indicating that a node exclusive NE lock has been applied to block node 1010 and intermediate exclusive IE locks applied to ancestor nodes comprising file node 101 and root node 10. In addition, registers associated with root, file and block nodes 10, 101, 1010, have been set to record that intermediate exclusive IE and node exclusive NE locks, respectively, have been applied to nodes of infrastructure 1. Program 3, FIG. 5, then exits, step 341, from the lock sequence of program 3. If the requested lock is not compatible with the current lock status of the selected block node 1010, step 321, then program 3, step 324, clears the intermediate exclusive IE locks previously applied to ancestor root node 10 and file node 101, denies current process node access, step 325, and exits from the lock sequence, step 341.

Computer 2 may concurrently run process 211 with process 210 and which process 211, FIG. 2, requires that node exclusive NE locks be applied to file node 101 and to information node 10100 which are ancestral and child nodes, respectively, of previously locked block node 1010. Assuming that process 211 first requests that a node exclusive NE lock be applied to file node 101, program 3 responds to the request by selecting file node 101, FIG. 5, step 301, and the type of lock identified as a node exclusive NE lock by process 211, step 302. It is determined, step 303, that selected file node 101 has ancestor nodes and a list thereof is generated, step 304, including file node 101 and root node 10. Root node 10, step 310, is selected from the generated ancestor list.

When it is requested that a node exclusive NE lock be applied to a child node, such as file node 101, table 1, FIG. 3, stipulates that an intermediate exclusive IE lock is to be selected and applied to the ancestor root node 10, FIG. 1. The compatibility of the selected intermediate exclusive IE lock, FIG. 5, step 312, is compared to the current status of locks recorded in the register corresponding with root node 10 in accordance with table 2, FIG. 4. Table 2 determines that an intermediate exclusive IE lock is compatible, FIG. 2, with the intermediate exclusive IE lock currently recorded in the register corresponding with root node 10, step 312. Since ancestor root node 10 is not selected block node 101, step 311, the register of root node 10, FIG. 2, is set to record that an intermediate exclusive IE lock is pending against root node 10 and node access is granted in accordance with the recorded lock standards, steps 314, 33.

File node 101, FIG. 5, is selected from the generated ancestor list, step 310, and since the ancestor list file node 101 is the select node, step 311, program 3 checks the compatibility of the select node exclusive NE lock, step 320, with the current lock status set forth in the register corresponding with file node 101. It is determined in accordance with table 2, FIG. 4, that the select node exclusive NE lock to be applied to file node 101 is compatible with the intermediate exclusive IE lock currently pending against file node 101, step 321. Accordingly, the register corresponding with file node 101, step 322, is set to record that a node exclusive NE lock has been applied thereto. A process node record, FIG. 2, is established in process 211 indicating that intermediate exclusive IE and node exclusive NE locks have been applied to root node 10 and file node 101, respectively. Process access is granted to these nodes in accordance with the standards of the locks currently applied to root and file nodes 10, 101, and program 3 exits from the lock sequence, steps 323, 341.

Process 211, FIG. 2, which is assumed to be concurrently running with process 210, may also require that a node exclusive NE lock be applied against information node 10100 in addition to the node exclusive NE lock previously applied to file node 101. Lock sequence program 3, FIG. 5, step 30, selects information node 10100, determines that a node exclusive NE lock is to be applied thereto and generates an ancestor list including ancestral root, file, block nodes 10, 101, 1010 and information node 10100. Program 3, step 31, determines that an intermediate exclusive IE lock, corresponding with the selected node exclusive NE lock, table 1, FIG. 3, is compatible with the intermediate and node exclusive IE, NE locks currently applied to listed ancestral root, file and block nodes 10, 101, 1010. Accordingly, the registers corresponding with these nodes are set to record that an intermediate exclusive IE lock has been applied against the nodes and process access is enabled to each ancestral node in accordance with the current lock status pending against the listed ancestral nodes.

Since there are no locks currently pending against selected information node 10100, the selected node exclusive NE lock is compatible with the current lock status of information node 10100, steps 311, 32. The register corresponding with information node 10100 is set to record that a node exclusive NE lock is currently pending against information node 10100 and process access is granted thereto. A process node record, FIG. 2, is established indicating that intermediate exclusive IE locks have been applied against ancestral root, file and block nodes 10, 101, 1010 and a node exclusive NE lock against information node 10100 after which, FIG. 5, program 3 exits the lock sequence, step 341.

If, during the operation of program 3, it is determined that the selected lock, step 321, or the intermediate lock corresponding thereto, step 313, is not compatible with the current lock status of a node, all locks previously applied to ancestral nodes during the current running of the lock sequence are cleared. Process access is denied to the nodes in accordance with the provisions of the cleared locks, steps 324, 325, and program 3 exits from the lock sequence. When it is determined that the select node does not have any ancestor nodes, step 303, program 3, step 32, determines the compatability of the selected lock with the current status of the selected node, steps 320, 321. If the select lock is compatible with the current lock status of the node, program 3 sets the node register to record the application of the lock, establishes a process node record and enables process access to the node in accordance with the lock standards and exits from the lock sequence.

In accordance with the principles of the invention, the apparatus and the method of operation of computer 2 locks one of the complex nodes of infrastructure 1, for example block node 1010, in response to a request of a process 210 to enable process 210 to write information into and read information from locked block node 1010. In addition, ancestral and child nodes 101, 10100 located in the tree structure of locked block node 1010 may be selectively locked by concurrently running processes, such as process 211, independent of locked block node 1010.

I claim:

1. Apparatus for controlling concurrent process operations against a complex infrastructure comprising tree structures of complex object nodes wherein said apparatus comprises means responsive to a request of a first one of the process operations to access a node for locking the acess node with exclusive, reserve and share locks to enable said first process operation to write information into and read information from said locked access node and for locking each ancestral node within tree structures of the access node with an intermediate exclusive, reserve and share lock corresponding with the lock applied to the access node, and means responsive to requests from other ones of the process operations for selectively and concurrently locking ancestral and child nodes of said locked access node located in tree structures of said locked access node with exclusive, reserve and share locks independent of said locked access node.

2. The infrastructure controlling apparatus set forth in claim 1 comprising means responsive to said process operation requests of a lock for an access node for selecting said access node and generating a list of ancestral nodes related to said selected access node.

3. The infrastructure controlling apparatus set forth in claim 2 comprising means operative upon selecting said access node and generating said list of ancestral nodes for determining an intermediate lock corresponding with said requested lock and comparing said intermediate lock with a current lock status of each listed ancestral node.

4. The infrastructure controlling apparatus set forth in claim 3 comprising means operative upon determining a compatibility of said intermediate lock with said current lock status of each ancestral node for applying said intermediate lock to the ancestral node and setting the ancestral node current lock status to record said node applied intermediate lock.

5. The infrastructure controlling apparatus set forth in claim 4 comprising means enabled upon applying said intermediate lock to all ancestral nodes of said selected access node for comparing said process operation requested lock with a current lock status of said selected access node.

6. The infrastructure controlling apparatus set forth in claim 5 comprising means operative upon determining a compatibility of said process operation requested lock with said current lock status of said selected access node for applying said process operation requested lock to said selected access node and updating the selected access node current lock status to record said application of said process operation requested lock.

7. The infrastructure controlling apparatus set forth in claim 6 comprising means for comparing each of said other process operation requested locks with a current lock status of each ancestral and child node of said selected access node and operative upon determining a compatibility of each said other process operation requested lock with said ancestral and child node current lock status for applying said other process operation requested lock to said ancestral and child node of said selected access node thereby enabling said other process operations to concurrently write into and read information from said locked ancestral and child nodes independent of the current lock status of said selected access node.

8. Apparatus for controlling concurrent process operations against a complex infrastructure comprising tree structures of complex object nodes wherein said apparatus comprises means responsive to a request of a first one of the process operations of one of exclusive, reserve and share locks for an access node for selecting said access node and generating a list of ancestral nodes related to said selected node, means for determining a compatibility of an intermediate lock corresponding with said requested lock with a current lock status of each listed ancestral node.

means operative upon determining the compatibility of said intermediate lock with said current lock status of each ancestral node for applying said intermediate lock to each ancestral node and setting the ancestral node current lock status to record said node applied intermediate lock, means enabled upon applying said intermediate lock to all listed ancestral nodes of said selected node for comparing said process operation requested lock with a current lock status of said selected node, means operative upon determining a compatibility of said process operation requested lock with said current lock status of said selected node for applying said process operation requested lock to said selected node and updating the selected node current lock status to record said application of said process operation requested lock, and means for comparing each of other process operation requested locks with a current lock status of each listed ancestral node of said selected node and operative upon determining a compatibility of each said other process operation requested lock with said ancestral node current lock status for applying said other process operation requested locks to said ancestral and child nodes of said selected node thereby enabling said other process operations to concurrently write into and read information from said locked ancestral and child nodes independent of the current lock status of said selected node.

9. A computer implemented method for controlling concurrent process operations against a complex infrastructure having tree structures of complex object nodes comprising the steps of locking one of the nodes with one of exclusive, reserve and share locks and each ancestral node of said locked node with an intermediate type of lock corresponding with said one lock in response to a request of a first one of the process operations to enable the first process operation to write information into and read information from the locked node, and selectively and concurrently locking ones of said ancestral and child nodes located in the tree structure of said locked node in response to requests from other ones of the process operations independent of said one locked node.

10. The computer implemented method of controlling concurrent process operations against a complex infrastructure as set forth in claim 9 comprising the step of selecting said one node in response to said one process operation lock request and generating a list of ancestral nodes related to said one selected node.

11. The computer implemented method of controlling concurrent process operations against a complex infrastructure as set forth in claim 10 comprising the step of comparing an intermediate lock corresponding with said process operation requested lock with a current lock status of each listed ancestral node.

12. The computer implemented method of controlling concurrent process operations against a complex infrastructure as set forth in claim 10 comprising the step of applying said intermediate lock to each ancestral node and updating each ancestral node current lock status to record said node applied intermediate lock upon determining a compatibility of said intermediate lock with said current lock status of each ancestral node.

13. The computer implemented method of controlling concurrent process operations against a complex infrastructure as set forth in claim 12 comprising the step of comparing after applying said intermediate lock to all ancestral nodes of said selected node said process operation requested lock with a current lock status of said selected node.

14. The computer implemented method of controlling concurrent process operations against a complex infrastructure as set forth in claim 13 comprising the step of applying said process operation requested lock to said selected node upon determining a compatibility of said process operation requested lock with said current lock status of said selected node and updating the selected node current lock status to record said application of said process operation requested lock.

15. The computer implemented method of controlling concurrent process operations against a complex infrastructure as set forth in claim 14 comprising the step of comparing each of other process operation requested locks with a current lock status of each ancestral node of said selected node and operative upon determining a compatibility of each said other process operation requested lock with said ancestral node current lock status by applying said other process operation requested lock to said ancestral and child node of said selected node thereby enabling said other process operations to concurrently write into and read information from said locked ancestral and child nodes independent of the current lock status of said selected node.

16. A computer implemented method for controlling concurrent process operations against a complex infrastructure having tree structures of complex object nodes comprising the steps of selecting one of the nodes in response to a process lock request and generating a list of ancestral nodes related to said selected node, comparing an intermediate lock corresponding with said process requested lock with a current lock status of each listed ancestral node, applying said intermediate lock to each ancestral node and updating each ancestral node current lock status to record said node applied intermediate lock upon determining a compatibility of said intermediate lock with said current lock status of each ancestral node, comparing after applying said intermediate lock to all ancestral nodes of said selected nodes said process requested lock with a current lock status of said selected node, applying said process requested lock to said selected node upon determining a compatibility of said process requested lock with said current lock status of said selected node and updating the selected node current lock status to record said application of said process requested lock, and comparing each one of other process requested locks with a current lock status of each ancestral node of said selected node and operative upon determining a compatibility of each said one other process requested lock with said ancestral node current lock status for selectively applying said other process requested lock to said ancestral node of said selected node thereby enabling said other processes to concurrently write into and read information from said locked ancestral and child nodes independent of the current lock status of said selected node.

* * * * *